United States Patent [19]

Bossi et al.

[11] Patent Number: 4,782,278

[45] Date of Patent: Nov. 1, 1988

[54] MOTOR STARTING CIRCUIT WITH LOW COST COMPARATOR HYSTERESIS

[75] Inventors: Joseph S. Bossi, South Milwaukee; Victor A. Murn, Muskego, both of Wis.

[73] Assignee: PT Components, Inc., Milwaukee, Wis.

[21] Appl. No.: 76,297

[22] Filed: Jul. 22, 1987

[51] Int. Cl.⁴ .............................. H02P 1/42
[52] U.S. Cl. .................. 318/786; 318/785; 318/778
[58] Field of Search ............ 318/785, 786, 778, 779, 318/784, 789

[56] References Cited

U.S. PATENT DOCUMENTS

| | | | |
|---|---|---|---|
| 3,882,364 | 5/1975 | Wright et al. | 318/786 |
| 3,970,908 | 7/1976 | Hansen et al. | 318/786 |
| 4,375,613 | 3/1983 | Fuller et al. | 318/786 |
| 4,382,217 | 5/1983 | Horner et al. | 318/778 |
| 4,604,563 | 8/1986 | Min | 318/786 |
| 4,605,888 | 8/1986 | Kim | 318/786 |
| 4,622,506 | 11/1986 | Shemanske et al. | 318/786 |
| 4,651,077 | 3/1987 | Woyski | 318/786 |
| 4,658,195 | 4/1987 | Min | 318/786 |
| 4,670,697 | 6/1987 | Wrege et al. | 318/786 |

Primary Examiner—William M. Shoop, Jr.
Assistant Examiner—Brian Young
Attorney, Agent, or Firm—Andrus, Sceales, Starke & Sawall

[57] ABSTRACT

A low cost, low part content single phase AC induction motor control starting circuit is provided which is speed sensitive, load sensitive and AC line voltage fluctuation insensitive. A dual comparator chip (20, 22) senses and compares relative magnitudes of AC line and auxiliary winding voltages (48, 40) to de-energize the auxiliary winding (2) at cut-out speed, and automatically re-energize the auxiliary winding at cut-in speed to accelerate or restart the motor from an overload or stall condition. Hysteresis circuitry (20, 50, 52, 57, 80) provides a lower cut-in speed than cut-out speed. Simplified power supply and voltage detection circuitry is also disclosed.

7 Claims, 2 Drawing Sheets

MOTOR STARTING CIRCUIT WITH LOW COST COMPARATOR HYSTERESIS

BACKGROUND AND SUMMARY

The invention relates to disconnect switches for use with the start or auxiliary winding of a single phase AC induction motor. The invention particularly relates to improvements in further reduced cost and part content over the circuitry shown in commonly owned U.S. Pat. Nos. 4,622,506, 4,658,195 and 4,670,697, incorporated by reference.

The present invention provides simplified comparator circuitry, with reduced part content. The invention also provides simplified main and auxiliary winding voltage detectors and power supply circuitry of reduced cost.

DETAILED DESCRIPTION

As known in the art, a single phase AC induction motor has a main winding for running the motor, and a start or auxiliary winding. The auxiliary winding is energized when starting the motor, and then disconnected at a given motor speed. The fields in the main and auxiliary windings are phase shifted, for example by capacitance, inductance, resistance or the like, to establish a rotating magnetic field for starting torque.

Figure 1:
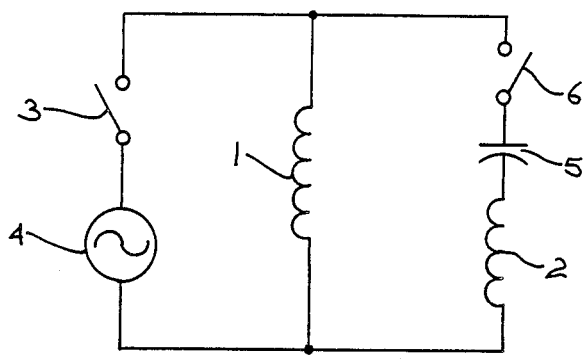
FIG. 1 schematically shows a typical environment in which the preferred embodiment of the invention is used.

FIG. 1 shows main winding 1 and auxiliary winding 2 of a single phase AC induction motor connectable through a switch 3 to an AC power source 4. In capacitor start type motors, the start winding circuit includes a start capacitor 5. When the motor reaches a given cut-out speed, start switch 6 is opened to disconnect auxiliary winding 2 from AC source 4. The present invention provides control circuitry for start switch 6.

Figure 2:
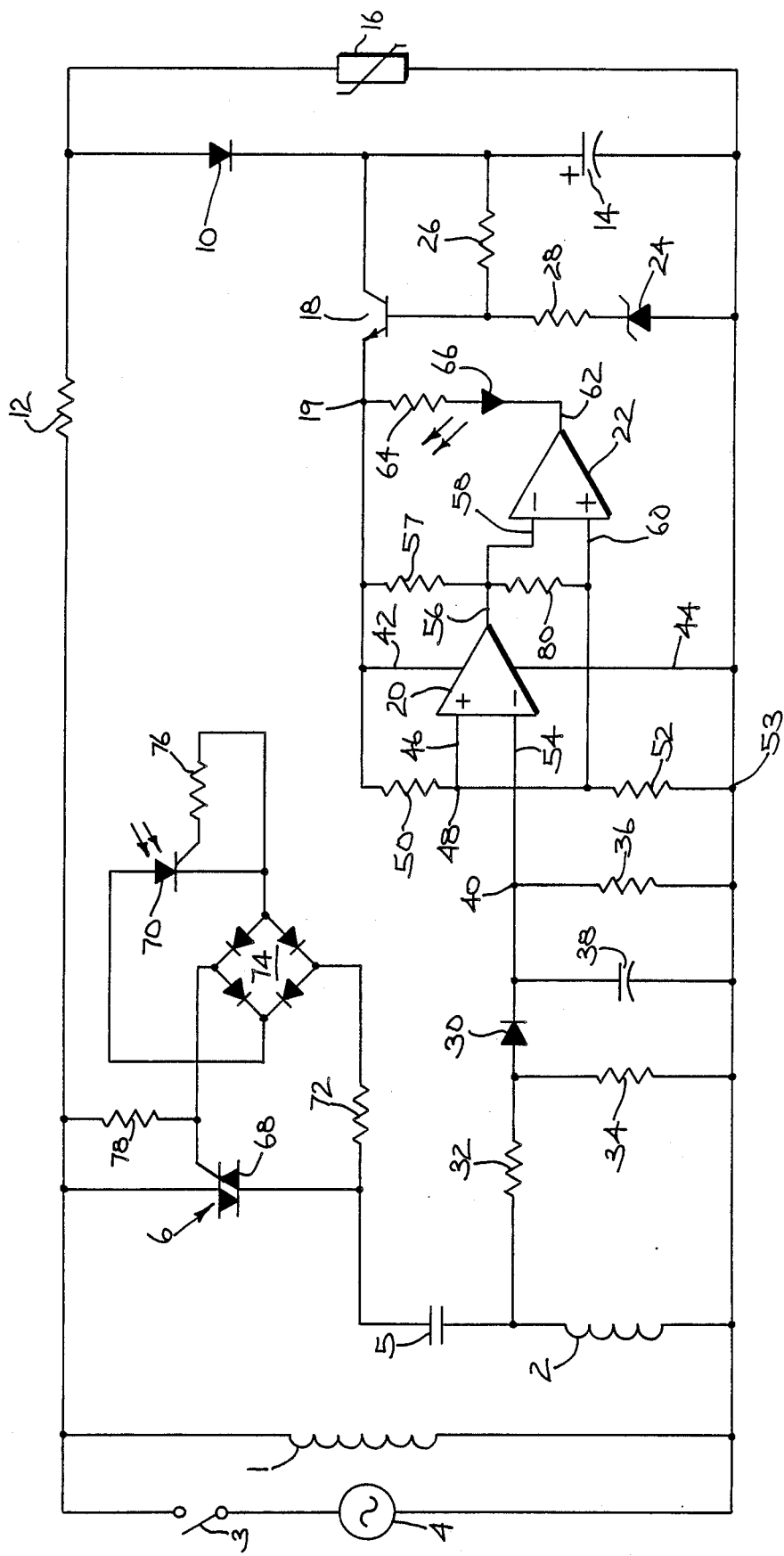
FIG. 2 is a circuit diagram of a motor control starting circuit in accordance with the invention.

Referring to FIG. 2, a main voltage detector circuit including diode 10 is connected across AC source 4 for sensing the input AC line reference voltage. Voltage from AC source 4 is sensed through resistor 12 and halfwave rectifying diode 10, and filtered by capacitor 14. Varistor 16 provides transient spike protection. An NPN bipolar pass transistor 18 has its emitter-collector circuit connected between AC source 4 and node 19 which provides sensed voltage from AC source 4 and also provides a DC power supply for a pair of comparators 20 and 22, to be described. The base circuit of transistor 18 includes a zener diode 24 applying a limited voltage from AC source 4 to the base of transistor 18 to bias the latter into conduction. Base drive current is supplied through resistor 26. Resistor 28 is connected between zener diode 24 and the base of transistor 18. Resistor 28 develops an IR drop thereacross which varies with the varying voltage from AC power source 4 and applies varying bias to the base of transistor 18. Zener diode 24 limits the conductivity of transistor 18, and resistor 28 varies such conductivity according to the IR drop thereacross. This provides conductivity modulation to vary the voltage at node 19 at the emitter of transistor 18 to track the voltage from AC source 4 and provide line compensation.

An auxiliary voltage detector circuit including diode 30 is connected across auxiliary winding 2 for sensing auxiliary winding voltage. The auxiliary winding voltage is reduced by the voltage divider network provided by resistors 32 and 34 and sensed through halfwave rectifying diode 30 and resistor 36 and filtered by capacitor 38, to provide sensed auxiliary winding voltage at node 40.

Voltage comparators 20 and 22 are provided by a dual comparator chip having power supply voltage provided at line 42 from node 19, and are connected by line 44 to a common reference at 53. Noninverting input 46 of comparator 20 senses voltage from AC source 4 at node 48 as reduced from node 19 by the voltage divider network provided by resistors 50 and 52. Inverting input 54 of comparator 20 senses auxiliary winding voltage at node 40. Comparator 20 compares the auxiliary winding voltage against the voltage from AC source 4. When the auxiliary winding voltage increases as a function of motor speed to a predetermined cut-out value relative to the voltage at node 48 from AC source 4, comparator 20 outputs a turn-off signal at output 56 causing switch 6 to open and disconnect auxiliary winding 2 from AC source 4, to be described. When the auxiliary winding voltage decreases as a function of motor speed to a predetermined cut-in value relative to the voltage at node 48, comparator 20 outputs a turn-on signal at output 56 causing switch 6 to close and connect auxiliary winding 2 to AC source 4. The predetermined cut-in value corresponds to a voltage derived from rotationally induced voltage in the auxiliary winding during overload or stall of the motor after starting.

Figure 3:
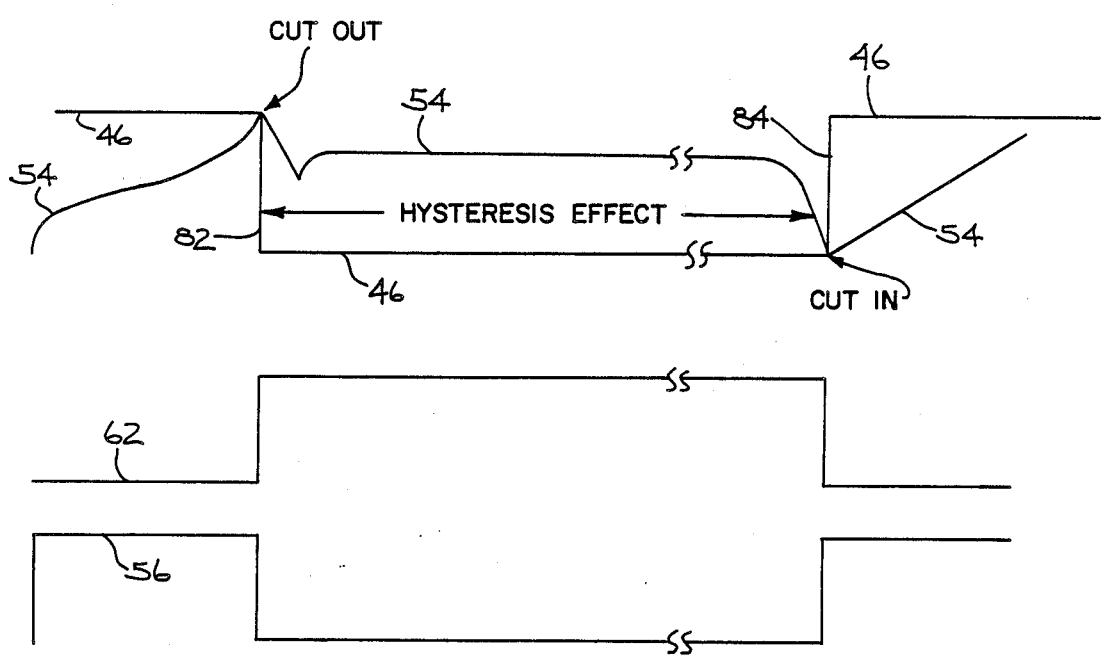
FIG. 3 is a waveform diagram illustrating operation of the circuitry of FIG. 2.

At initial energization of the motor, the auxiliary winding voltage is zero, or at least substantially smaller than the main winding voltage, and hence the voltage at comparator input 54 is less than that at comparator input 46, FIG. 3, and thus comparator output 56 is high, as referenced through pull-up resistor 57 to node 19. Comparator output 56 is connected to inverting input 58 of comparator 22. When comparator output 56 is high, comparator output 62 is low, which enables conduction from node 19 through resistor 64 and light emitting diode 66, which turns on switch 6.

Switch 6 is an optically triggered semiconductor power switch, including a power triac 68. LED 66 is optically coupled to light responsive SCR 70 to optically drive the latter into conduction, which in turn conducts current through resistor 72 and bridge circuit 74 to the gate of triac 68 to bias the latter into conduction. Resistors 76 and 78 improve dv/dt capability of SCR 70 and triac 68, respectively. Upon conduction of triac 68, current flows from AC source 4 through start capacitor 5 and auxiliary winding 2.

As motor speed increases, the sensed auxiliary winding voltage at node 40 increases. At a given cut-out value the voltage at comparator input 54 increases as a function of motor sped above that at comparator input 46. Comparator output 56 then goes low, which low state is supplied to comparator input 58, which in turn causes comparator output 62 to go high. The high state at comparator output 62 disables conduction through LED 66, which terminates the emmission of light to SCR 70 such that the latter turns OFF, which in turn removes the gate drive from triac 68, such that the latter turns OFF. Turn-off of triac 68 disconnects auxiliary winding 2 from AC source 4.

Comparator output 56 is connected through resistor 80 to comparator input 46 at node 48. When comparator output 56 goes low at the noted cut-out speed, the voltage at comparator input 46 is reduced through the connection provided by resistor 80, as shown at transition 82 in FIG. 3, i.e. the voltage at input 46 is pulled low by its connection through resistor 80 to low output 56. Output 56 is now at approximately the same potential as reference 53. The voltage at comparator input 46 is modified because resistor 80 is now effectively in parallel with resistor 52. Comparator output 56 will not transition high again until the auxiliary winding voltage at input 54 decreases below the lowered and modified voltage at input 46, as shown at transition 84 in FIG. 3. Comparator output 56 then goes high again, to turn on start switch 6 and reconnect auxiliary winding 2 to AC source 4. The connection through resistor 80 provides hysteresis such that the cut-in speed is always lower than the cut-out speed.

The connection through resistor 80 changes the voltage at comparator input 46 according to the voltage at comparator output 56 such that the auxiliary winding voltage at comparator input 54 is compared against different voltages at comparator input 46. A lower comparison reference voltage is provided at input 46 when output 56 is low and outputting a turn-off signal because resistor 80 is now effectively in parallel with resistor 52. A higher comparison reference voltage is provided at input 46 when output 56 is high and providing a turn-on signal. Auxiliary winding voltage must decrease to a cut-in value established by the new voltage divider ratio of resistors 50, 52 and 80 which is less than the cut-out value, whereupon comparator output 56 changes states to output the turn-on signal to comparator 22 to reconnect auxiliary winding 2 to AC source 4.

Resistor 80 is connected between comparator inputs 58 and 60 and provides a voltage drop therebetween. Comparator input 60 is connected to node 48. When comparator output 56 is low, the reference voltage from AC source 4 at node 48 is dropped across resistor 80 in parallel with resistor 52 to low output 56, and the voltage at comparator input 60 is higher than that at comparator input 58. When comparator output 56 is high, the voltage thereat is dropped across resistor 80 to node 48 and through resistor 52 to common reference 53, and the voltage at comparator input 58 is higher than that at comparator input 60.

It is recognized that various equivalents, alternatives and modifications are possible within the scope of the appended claims.

We claim:

1. In a single phase AC induction motor having a main winding and an auxiliary winding both connectable to an AC power source, and having a switch for disconnecting said auxiliary winding from said AC source, a control circuit for said switch comprising:

main voltage detector means sensing voltage from said AC source;

auxiliary voltage detector means sensing auxiliary winding voltage;

voltage comparator means having a first input connected to said main voltage detector means and a second input connected to said auxiliary voltage detector means and comparing said auxiliary winding voltage against said voltage from said AC source and outputting a turn-off signal causing said switch to disconnect said auxiliary winding from said AC source when said auxiliary winding voltage increases to a predetermined cut-out value relative to said voltage from said AC source as a function of motor speed, and outputting a turn-on signal causing said switch to connect said auxiliary winding to said AC source when said auxiliary winding voltage decreases to a predetermined cut-in value relative to said voltage from said AC source as a function of motor speed, said predetermined cut-in value corresponding to a voltage derived from rotationally induced voltage in said auxiliary winding during overload or stall of said motor after starting;

hysteresis means responsive to said turn-off signal to change the voltage at one of said inputs of said comparator means such that said auxiliary winding voltage must decrease to a cut-in value which is less than said cut-out value before reconnection of said auxiliary winding to said AC source, wherein said hysteresis means comprises a connection between the output of said comparator means and said one input of said comparator means to adjust the voltage level at said one input according to said output.

2. The invention according to claim 1 wherein said connection is from said output to said first input of said comparator means, and wherein said connection lowers the voltage at said first input when said comparator means is outputting said turn-off signal.

3. The invention according to claim 1 wherein said main voltage detector means comprises a pass transistor having an emitter-collector circuit connected between said AC source and said comparator means, and having a base circuit including a zener diode applying a limited voltage from said AC source to the base of said transistor to bias the latter into conduction, and including a resistor connected between said zener diode and said base of said transistor, said resistor developing an IR drop thereacross which varies with varying voltage from said AC source and applies varying bias to said base of said transistor, said zener diode limiting the conductivity of said transistor, said resistor varying such conductivity according to the IR drop thereacross, providing conductivity modulation and varying the voltage at said first input of said comparator means to track the voltage from said AC source.

4. In a single phase AC induction motor having a main winding and an auxiliary winding both connectable to an AC power source, and having a switch for disconnecting said auxiliary winding from said AC source, a control circuit for said switch comprising:

main voltage detector means sensing voltage from said AC source;

auxiliary voltage detector means sensing auxiliary winding voltage;

a first voltage comparator having a first input connected to said main voltage detector means and a second input connected to said auxiliary voltage detector means and comparing said auxiliary winding voltage against said voltage from said AC source and outputting a turn-off signal when said auxiliary winding voltage increases to a predetermined cut-out value relative to said voltage from said AC source as a function of motor speed, and outputting a turn-on signal when said auxiliary winding voltage decreases to a predetermined cut-in value relative to said voltage from said AC source as a function of motor speed, said predetermined cut-in value corresponding to a voltage derived from rotationally induced voltage in said auxiliary winding during overload or stall of said motor after starting;

a second voltage comparator connected to the output of said first comparator, said second comparator being responsive to said turn-off signal from said first comparator to output a turn-off signal to said switch to disconnect said auxiliary winding from said AC source, said second comparator being responsive to said turn-on signal from said first comparator to output a turn-on signal to said switch to connect said auxiliary winding to said AC source;

means connecting said output of said first comparator to one of said inputs of said first comparator to change the voltage at said one input of said first comparator according to the voltage at said output of said first comparator such that the voltage at the other input of said first comparator is compared against different voltages at said one input of said first comparator according to the output state of said first comparator, the voltage at said other input of said first comparator being compared against a first voltage at said one input of said first comparator when said first comparator is outputting said turn-off signal, the voltage at said other input of said first comparator being compared against a second voltage at said one input of said first comparator when said first comparator is outputting said turn-on signal, and wherein said first voltage at said one input of said first comparator is higher than said second voltage at said one input of said first comparator such that said auxiliary winding voltage must decrease to a cut-in value which is less than said cut-out value before said output of said first comparator changes states to output said turn-on signal to said second comparator to reconnect said auxiliary winding to said AC source, wherein said second comparator has a first input connected to said first input of said first comparator, and has a second input connected to said output of said first comparator, and comprising a resistor connected between said inputs of said second comparator to provide a voltage drop therebetween, and wherein said output of said first comparator is connected through said resistor to said first input of said first comparator to change the voltage at said first input of said first comparator according to the voltage at said output of said first comparator.

5. The invention according to claim 4 comprising a voltage divider network comprising a pair of resistors connected in series between said main voltage detector means and a common reference, said first inputs of said first and second comparators each being a noninverting input and connected to a node between said pair of resistors, and wherein said output of said first comparator goes low when said auxiliary winding voltage at said second input of said first comparator increases above said voltage at said first input of said first comparator to provide a low state at said second input of said second comparator which is an inverting input of said second comparator, said first input of said second comparator being supplied with said voltage from said node between said pair of resistors which voltage is dropped across said first mentioned resistor to said low output of said first comparator, such that the voltage at said first input of said second comparator is greater than the voltage at said second input of said second comparator and said output of said second comparator goes high which provides said turn-off signal to said switch to disconnect said auxiliary winding from said AC power source, said low output of said first comparator also reducing the voltage at said first input of said first comparator through said first mentioned resistor connected between said first input of said first comparator and said output of said first comparator, and wherein said output of said first comparator goes high when said auxiliary winding voltage at said second input of said first comparator decreases below the lowered voltage at said first input of said first comparator at said cut-in value less than said cut-out value, said high output of said first comparator providing a high state at said second input of said second comparator, the voltage at said high output of said first comparator being dropped across said first mentioned resistor to said node, such that the voltage at said second input of said second comparator is higher than the voltage at said first input of said second comparator and said output of said second comparator goes low which provides said turn-on signal to said switch to reconnect said auxiliary winding to said AC source.

6. The invention according to claim 5 wherein said main voltage detector means comprises a pass transistor having an emitter-collector circuit connected between said AC source and said first and second comparators, including a connection through a light emitting means to said output of said second comparator, wherein said light emitting means is conductive and emits light when said output of said second comparator is low, and said light emitting means is nonconductive and does not emit light when said output of said second comparator is high, and wherein said switch comprises optically triggered semiconductor power switch means triggered b the light from said light emitting means, said pass transistor having a base circuit including a zener diode applying a limited voltage from said AC source to the base of said transistor to bias the latter into conduction, and including a resistor connected between said zener diode and said base of said transistor, said last mentioned resistor developing an IR drop thereacross which varies with the varying voltage from said AC source and applies varying bias to said base of said transistor, said zener diode limiting the conductivity of said transistor, and said last mentioned resistor varying such conductivity according to the IR drop thereacross, providing conductivity modulation to vary the voltage at said first inputs of said first and second comparators to track the voltage from said AC source.

7. In a single phase AC induction motor having a main winding and an auxiliary winding both connectable to an AC power source, and having a switch for disconnecting said auxiliary winding from said AC source, a control circuit for said switch comprising:

main voltage detector means sensing voltage from said AC source;

auxiliary voltage detector means sensing auxiliary winding voltage;

voltage comparator means having a first input connected to said main voltage detector means and a second input connected to said auxiliary voltage detector means and comparing said auxiliary winding voltage against said voltage from said AC source and outputting a turn-off signal causing said switch to disconnect said auxiliary winding from said AC source when said auxiliary winding voltage increases to a predetermined cut-out value relative to said voltage from said AC source as a function of motor speed, and outputting a turn-on signal causing said switch to connect said auxiliary winding to said AC source when said auxiliary winding voltage decreases to a predetermined cut-in value relative to said voltage from said AC source as a function of motor speed, said predetermined cut-in value corresponding to a voltage derived from rotationally induced voltage in said auxiliary winding during overload or stall of said motor after starting;

hysteresis means responsive to said turn-off signal to change the voltage at one of said inputs of said comparator means such that said auxiliary winding voltage must decrease to a cut-in value which is less than said cut-out value before reconnection of said auxiliary winding to said AC source.

* * * * *